(12) United States Patent
Xu (10) Patent No.: US 9,630,641 B2
(45) Date of Patent: Apr. 25, 2017

(54) CARRIER WITH STAIR CLIMBING AID AND STAIR CLIMBING AID FOR A CARRIER

(71) Applicant: Jordan Jianping Xu, Lovettsville, VA (US)

(72) Inventor: Jordan Jianping Xu, Lovettsville, VA (US)

(*) Notice: Subject to any disclaimer, the term of this patent is extended or adjusted under 35 U.S.C. 154(b) by 337 days.

(21) Appl. No.: 14/275,972

(22) Filed: May 13, 2014

(65) Prior Publication Data

US 2015/0329134 A1 Nov. 19, 2015

(51) Int. Cl.
*B62B 5/02* (2006.01)

(52) U.S. Cl.
CPC .................... *B62B 5/025* (2013.01)

(58) Field of Classification Search
CPC .......... B62B 5/025; B62B 5/023; A61G 5/061
USPC .......... 180/8.1, 8.2, 8.3; 280/5.24, 5.3, 5.32, 280/5.26, 47.2, 47.17
See application file for complete search history.

(56) References Cited

U.S. PATENT DOCUMENTS

| | | | |
|---|---|---|---|
| 2,772,096 A | 11/1956 | Hanson | |
| 3,734,518 A * | 5/1973 | Sawmiller | B62B 5/023 280/5.3 |
| 4,046,391 A | 9/1977 | Restad et al. | |
| 5,577,567 A | 11/1996 | Johnson et al. | |
| 5,685,552 A * | 11/1997 | Osaki | A45C 13/385 280/37 |
| 6,164,398 A * | 12/2000 | Alber | B62B 5/023 180/8.1 |
| 6,397,960 B2 * | 6/2002 | Alber | A61G 5/061 180/8.2 |
| 6,938,740 B2 | 9/2005 | Gandy | |
| 6,938,905 B1 * | 9/2005 | Tsai | B62B 1/002 280/30 |
| 7,137,464 B2 * | 11/2006 | Stahler, Sr. | B62B 5/023 180/8.2 |
| 7,914,016 B2 * | 3/2011 | Guttormson | B62B 1/12 211/74 |
| 8,061,460 B2 | 11/2011 | Scheck | |
| 8,439,371 B1 | 5/2013 | Vazquez | |
| 8,596,388 B2 | 12/2013 | Bouhraoua et al. | |
| 8,596,433 B2 | 12/2013 | Tauro | |
| 8,967,628 B2 * | 3/2015 | Sabin | B62B 5/026 280/5.26 |
| 2007/0095581 A1 | 5/2007 | Chambliss et al. | |
| 2010/0108412 A1 | 5/2010 | Lynkaran et al. | |
| 2013/0186698 A1 | 7/2013 | Sarokhan et al. | |

* cited by examiner

*Primary Examiner* — Jacob Knutson
(74) *Attorney, Agent, or Firm* — WRB-IP LLP

(57) ABSTRACT

A carrier with a stair climbing aid includes a carrier including a top surface, a bottom surface, and a front surface and a rear surface between the top surface and the bottom surface, at least one guide bar attached to the rear surface, the guide bar having a first end disposed proximate a corner between the bottom surface and the rear surface and a second end at least as high as stair risers of stairs expected to be climbed, at least one elongated member movably attached to the guide bar, and an arrangement for urging a top end of the elongated, member toward the second end of the guide bar.

17 Claims, 6 Drawing Sheets

CARRIER WITH STAIR CLIMBING AID AND STAIR CLIMBING AID FOR A CARRIER

BACKGROUND AND SUMMARY

The present invention relates generally to carriers and more particularly to carriers with stair climbing aids.

Stairs facilitate traveling up and down vertical distances. When trying to move objects such as luggage, hand carts, and the like (hereinafter generically referred to as "carriers"), stairs pose an obstacle. When moving carriers such as, for example, luggage, such as a wheeled suitcase, up a flight of stairs, the rear surface of the carrier facing the stairs ordinarily defines an acute angle with a horizontal plane of the ground such that the rear surface of the carrier will ordinarily contact a nosing of the staircase at a point. The user will then pull the carrier up over the nosing of the staircase by dragging the rear surface of the carrier across the nosing of the staircase. This tends to damage the rear surface of the carrier as well as the nosing of the staircase. Some carriers are provided with fixed surfaces, such as projecting elongated structures that function similar to runners on sleds, to assist in dragging the carrier over the nosing of the staircase by reducing the surface area of the carrier in contact with the nosing, however, after a few such drags, the fixed surfaces tend to become scuffed and are not particularly helpful in reducing the amount of effort needed to drag the carrier over the nosing.

A variety of apparatus have been provided to facilitate raising of carriers over stairs. U.S. Patent App. Pub. US2013/0186698, for example, shows a carrier with a stair climbing aid with a large, bulky tri-wheel on each side. For this device to work, the height of the tri-wheel must be the same as the step or taller. The tri-wheel will tend to bang against steps and, therefore, it must be made of heavy, sturdy material, increasing its weight. The tri-wheel is impractical in many cases where space and weight is a concern. It might also damage the stairs by its impact against them.

U.S. Patent App. Pub. US2010/0108412 shows another form of carrier with a stair climbing aid in the form of an endless belt around an oval shaped track with small rollers under the belt. This arrangement would be expected to be expensive and heavy.

It is desirable to provide a carrier with a stair climbing aid that is simple to manufacture, inexpensive to manufacture, and light in weight.

According to an aspect of the present invention, a carrier with a stair climbing aid comprises a carrier comprising a top surface, a bottom surface, and a front surface and a rear surface between the top surface and the bottom surface, at least one guide bar attached to the rear surface, the guide bar having a first end disposed proximate a corner between the bottom surface and the rear surface and a second end at least as high as stair risers of stairs expected to be climbed, at least one elongated member movably attached to the guide bar, and means for urging a top end of the elongated member toward the second end of the guide bar.

According to another aspect of the present invention, a carrier with a stair climbing aid comprises a carrier comprising a to surface, a bottom surface, and a from surface and a rear surface between the top surface and the bottom surface, at least one guide bar attached to the rear surface, the guide bar having a first end disposed proximate a corner between the bottom surface and the rear surface and a second end at least as high as stair risers of stairs expected to be climbed, at least one elongated member movably attached to the guide bar, and means for urging a bottom end of the elongated member toward the first end of the guide bar.

According to yet another aspect of the present invention, a stair climbing aid is provided for a carrier, the carrier comprising a top surface, a bottom surface, and a front surface and a rear surface between the top surface and the bottom surface, the stair climbing aid comprising at least one guide bar attachable to the rear surface, the guide bar having a first end adapted to be disposed proximate a corner of the carrier between the bottom surface and the rear surface and a second end adapted to be disposed at least as high as stair risers of stairs expected to be climbed, at least one elongated member movably attached to the guide bar; and means for urging at least one of a top end of the elongated member toward the second end of the guide bar and a bottom end of the elongated member toward the first end of the guide bar.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
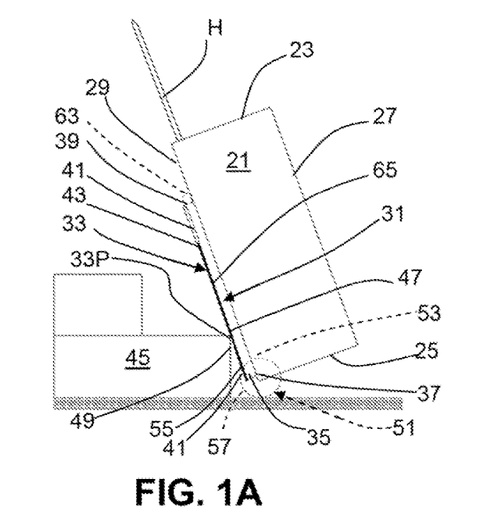
FIGS. 1A, 1B, and 1C are side views of an embodiment of a carrier with a stair climbing aid according to an aspect of the present invention showing the carder with the stair climbing aid in different stages of climbing a stair.
Figure 1B:
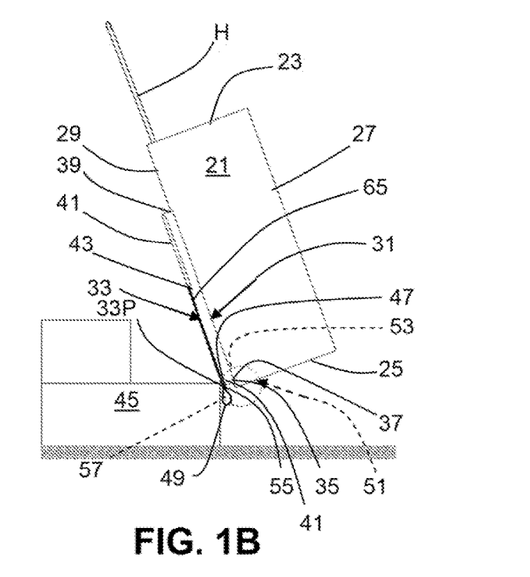
Figure 1C:
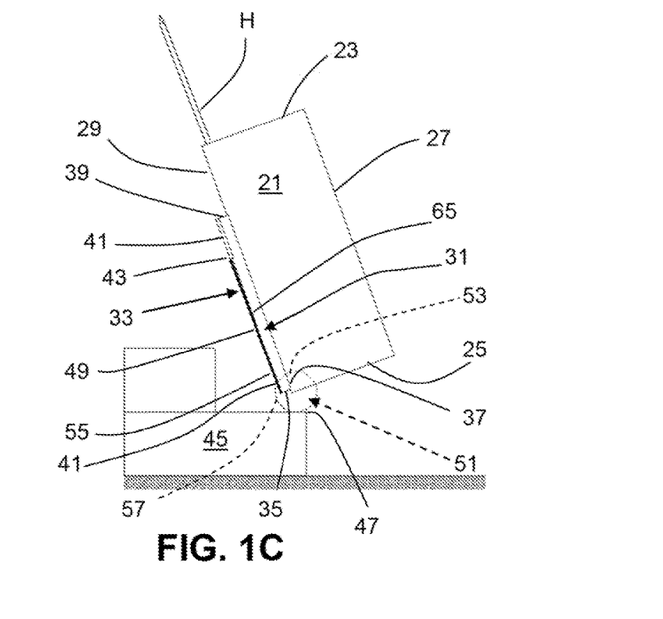

An embodiment of a carrier 21 with a stair climbing aid is shown in FIGS. 1A-1C. The stair climbing aid can be provided independently of the carrier and attached later, but is described here in connection with its structure and function when attached to the carrier. The carrier 21 comprises a top surface 23, a bottom surface 25, and a front surface 27 and a rear surface 29 between the top surface and the bottom surface. The carrier 21 can be a carrier such as a suitcase, duffle bag with a rigid rear surface 29, or other conventional carrier and may not have well-defined boundaries between the top, bottom, front, and rear surfaces. The designation of surfaces as top, bottom, front, and rear is arbitrary and is intended to refer to the locations of the surfaces while the carrier is being moved, and not necessarily the locations of the surfaces when the carrier is in a stationary loading or unloading position. The illustrated carrier 21 is in the form of a wheeled suitcase having a handle H.

Figures 3A, 3B:
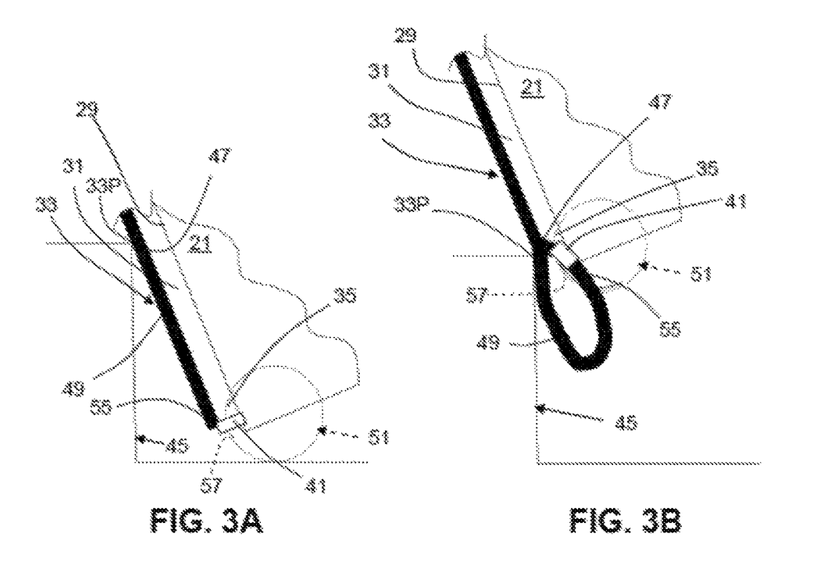
FIGS. 3A, 3B, and 3C are side views of a portion of a third embodiment of a carrier with a stair climbing aid according to an aspect of the present invention showing the carrier with the stair climbing aid in different stages of climbing a stair.
Figure 3C:
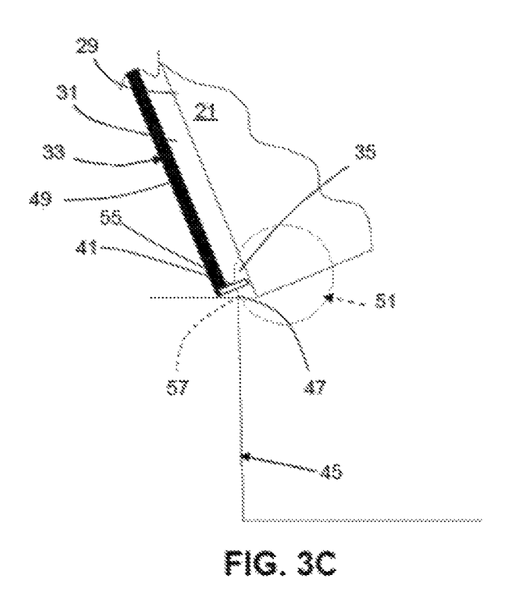
Figure 3D:
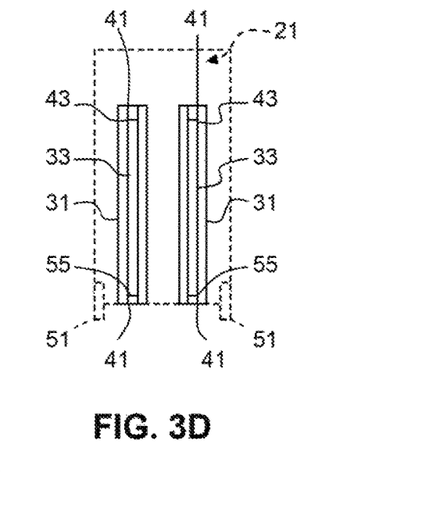
FIG. 3D is a rear view of the carrier of FIGS. 3A, 3B, and 3C.

The carrier 21 comprises at least one guide bar 31 attached to the rear surface 29 and at least one elongated member 33 movably attached to the guide bar (more than one guide bar 31 and elongated member are shown in FIG. 3D). The guide bar 31 has a first end 35 disposed proximate a corner 37 between the bottom surface 25 and the rear surface 29 and a second end 39 at least as high above the bottom surface 25 as stair risers of stairs expected to be climbed, and ordinarily somewhat higher. Stair risers are typically between about 4-7 inches (about 101-177 mm) in height, but can range upward or downward from that height. Stair treads are typically about 9 inches (about 228 min). The second end 39 will, thus, ordinarily be disposed at least about 8-10 inches (about 202-254 mm) above the bottom surface 25, and may be disposed as high as the top surface 23 or, if desired or necessary, higher. The guide bar 31 supports the elongated member 33 relative to the carrier 21 and will ordinarily itself be an elongated member fixed to the rear surface 29, but may be in the form of a series of discrete portions fixed to the rear surface. The guide bar 31 may also be integral with the carrier 21, such as when the carrier includes a molded plastic case with one or more ridges forming the guide bar on the rear surface 29.

The carrier 21 also includes means 41 for urging a top end 43 of the elongated member 33 toward the second end 39 of the guide bar 31 when climbing stairs and for urging the bottom end 55 of the elongated member toward the first end 35 of the guide bar when descending stairs. For purposes of discussion, operations involving going up or down stairs will both be referred to as "climbing" herein, except where otherwise noted. In operation when going up stairs, when the carrier 21 is moved into a position adjacent a stair 45 as shown in FIG. 1A, the elongated member 33 will abut the nosing 47 of the stair at a part 33p of the elongated member. The rearward surface 49 of the elongated member 33 is preferably made of a material, such as rubber, that would be expected to have a high coefficient of friction with a conventional stair tread material (at least compared to a coefficient of friction between contacting, surfaces of the elongated member and the guide bar 31, while not tending to damage the stair when contacting it. While it is presently contemplated that it will ordinarily be preferable to have an urging means attached proximate a to end 43 of the elongated member 33, it will be appreciated that the urging means that urges the top end 43 of the elongated member 33 toward the second end 39 of the guide bar 31 might, instead be disposed at the bottom end 55 of the elongated member (such as a spring that would tend to push the elongated member up toward the second end 39 of the guide bar 31), or somewhere in between. It will further be appreciated that a flexible elongated member 33 may, itself, form part or all of the urging means 41, such as when the elongated member is in the form of an elastic member.

When, as seen in FIG. 1B, the carrier 21 is raised relative to the stair 45, the part 33p of the elongated member 33 in contact with the nosing 47 of the stair will remain in place while the rest of the carrier, including the guide bar 31, is raised. This avoids dragging of a part of the carrier 21 against the nosing 47 of the stair, which could damage the carrier and the stair. FIG. 1B shows the carder 21 at or close to a highest position relative to the nosing 47 in which the part 33p of the elongated member 33 will remain in contact with the nosing 47.

When the carrier 21 is raised relative to the stair 45 to a point at which the first end 35 of the guide bar 31 is above the nosing 47 of the stair (or at which a wheel 51 contacts the stair and moves the guide bar 31 away from the nosing 47), the elongated member 33 is moved out of contact with the nosing of the stair. At this point, as seen in FIG. 1C, the urging means 41 urges the top end 43 of the elongated member 33 toward the second end 39 of the guide bar 31 so that the elongated member will be in position to contact a nosing of a next stair tread and the process shown in FIGS. 1A-1C can be repeated.

When the urging means 41 is in the form of a tension spring or an elastic cord, urging means can disposed at the top end 43 and the bottom end 55 of the elongated member 33. Such a construction can facilitate providing a stair climbing aid for going up stairs by the urging means urging the top end 43 of the elongated member 33 toward the second end 39 of the guide bar 31 after the elongated member has moved upward out of contact with the nosing 47 of a stair, as well as a stair climbing aid for going down stairs by the urging means urging the bottom end 55 of the elongated member toward the first end 35 of the guide bar after the elongated member has moved downward or otherwise out of contact with the nosing of the stair.

When the carrier 21 is moved downwardly relative to the stair 45 to a point at which the second end 39 of the guide bar 31 is below the nosing 47 of the stair or the elongated member 33 and the carrier are moved away from the stair (as when the carrier is moved horizontally on a next lower stair tread), the elongated member is moved out of contact with the nosing of the stair. At this point, the urging means 41 urges the bottom end 55 of the elongated member 33 toward the first end 35 of the guide bar 31 so that the elongated member will be in position to contact a nosing of a next stair tread and the process can be repeated.

Ordinarily, the carrier 21 will comprise at least one wheel 51, usually two wheels, at the corner 37 between the bottom surface 25 and the rear surface 29. The first end 35 of the guide bar 31 is ordinarily disposed even with or below an uppermost point 53 on the wheel 51 that is even with the rear surface 29 of the carrier 21. In this way, when the carrier 21 is raised relative to a stair 45, the wheel 51 will contact the nosing 47 of the stair no later than when the elongated member 33 is moved out of contact with the nosing of the stair, thereby tending to avoid damage to a portion of the carrier between the first end 35 of the guide bar 31 and the wheel 51.

At least a portion of the wheel 51 is ordinarily disposed rearwardly of the rear surface 29 of the carrier 21. However, the wheel 51 may be positioned so that no portion of the wheel is disposed rearwardly of the rear surface 29 of the carrier. The rearward surface 49 of the elongated member 33 is disposed rearwardly of the rear surface 29 of the carrier 21 to avoid damage to the rear surface of the carrier. When part of the wheel 51 extends rearwardly of the rear surface 29 of the carrier 21, the bottom end 55 of the elongated member 33 will ordinarily be disposed even with or below an uppermost point 53 on the wheel 51 that is even with the rear surface 29 of the carrier 21 so that contact between the carrier and the nosing 47 of a stair 45 being climbed will transition immediately from the elongated member to the wheel. If no part of the wheel 51 extends rearwardly of the rear surface 29, the bottom end 55 of the elongated member 33 will ordinarily be disposed at or below the corner 37 between the bottom surface 25 and the rear surface 29 so that contact between the elongated member and the nosing 47 of the stair 45 will transition immediately or after movement through space (but not into contact with a surface of the carrier) to the wheel 51.

As seen in FIGS. 1A-1C, when part of the wheel 51 extends rearwardly of the rear surface 29 of the carrier 21, the rearward surface 49 of the elongated member 33 can be disposed between rearwardmost point 57 of the wheel 51 and the rear surface 29 of the carrier 21. In this way, when the elongated member 33 and the nosing 47 of the stair 45 are moved out of contact, there should be an immediate transition of the carrier 21 to a position (FIGS. 1B-1C) in which the wheel contacts the nosing of the stair, with the carrier moving slightly outwardly as the wheel turns so that the rearwardmost point of the wheel contacts the nosing.

Figure 2A:
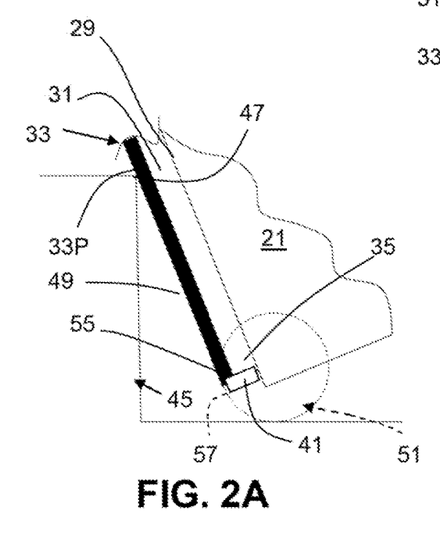
FIGS. 2A, 2B, and 2C are side views of a portion of a second embodiment of a carrier with a stair climbing aid according to an aspect of the present invention showing the carrier with the stair climbing aid in different stages of climbing a stair.
Figure 2B:
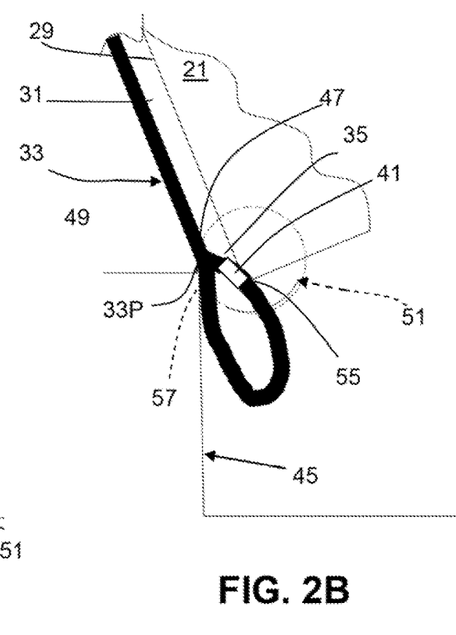
Figure 2C:
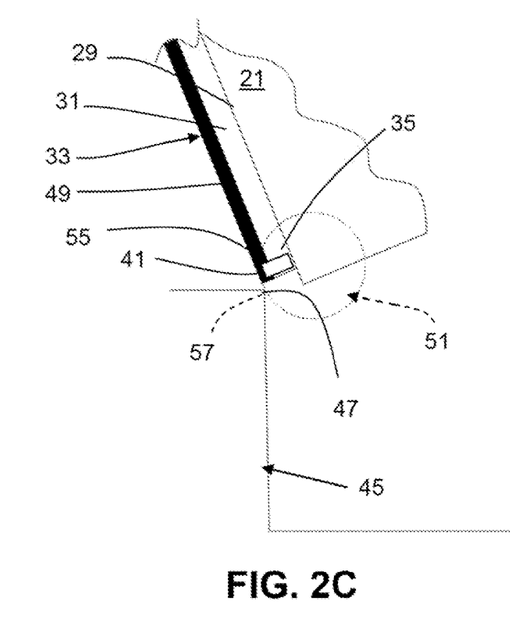

As seen in FIGS. 2A-2C, when part of the wheel 51 extends rearwardly of the rear surface 29 of the carrier 21, the rearward surface 49 of the elongated member 33 can be disposed even with a rearwardmost point 57 of the at least one wheel. In this way, when the elongated member 33 and the nosing 47 of the stair 45 are moved out of contact as the carrier 21 is raised past the point shown in FIG. 2B, there should be a smooth transition of the carrier 21 to a position (FIG. 2C) in which the wheel contacts the nosing of the stair.

As seen in FIGS. 3A-3C, when part of the wheel 51 extends rearwardly of the rear surface 29 of the carrier 21, the rearward surface 49 of the elongated member 33 can be disposed rearwardly of a rearwardmost point 57 of the at least one wheel. In this way, when the elongated member 33 and the nosing 47 of the stair 45 are moved out of contact as the carrier 21 is raised past the point shown in FIG. 3B, there should be a slight drop of the carrier 21 to a position (FIG. 3C) in which the wheel contacts the nosing of the stair.

After the carrier 21 is raised relative to the nosing 47 of the stair 45 to a point where the elongated member 33 and the nosing of the stair are moved out of contact with each other, the elongated member is returned to its original position, or as close to the original position as possible before the elongated member contacts another stair, by the urging means 41. Forms of urging means 41 can comprise a variety of suitable structures, such as a spring or an elastic cord as shown in FIGS. 1A-1C, or a drive, such as an electric motor 63 (shown in phantom in FIG. 1A) that operates to rewind the elongated member 33 or a windable material connected to the elongated member when the elongated member is out of contact with a stair 45. A sensor (not shown) can be provided, to send a signal to the electric motor 63 to start operating to return the elongated member 33 to its original position when the sensor senses no contact between the elongated member and another structure (such as a stair). The urging means 41 may comprise the elongated member 33 itself, such as when the elongated member is elastic or otherwise stretchable with a shape memory.

The elongated member 33 seen in FIGS. 1A-3C is a flexible elongated member. The word "flexible" is intended to describe items of sufficient flexibility that they cannot support themselves when standing on end. Non-limiting examples of suitable flexible structures include items such as rubber, leather, or linked metal or plastic belts, bands, straps, wires, or cords. When a flexible elongated member 33 is used, it is ordinarily attached at its bottom end 55 to and slidable relative to the first end 35 of the guide bar 31 and is attached to and slidable relative to the guide bar at the top end 43 of the elongated member. Ordinarily, the urging means 41 connects the top end 43 of the elongated member 22 to the guide bar.

Figure 4A:
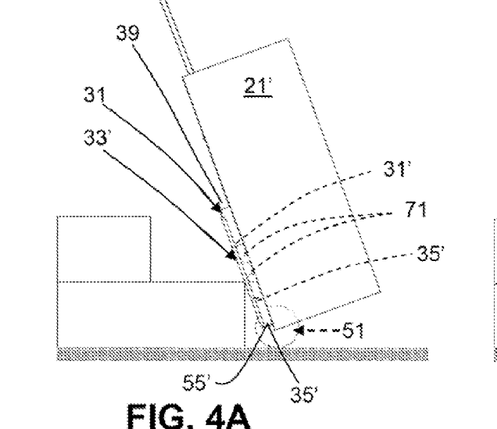
FIGS. 4A, 4B, and 4C are side views of a fourth embodiment of a carrier with a stair climbing aid according to an aspect of the present invention showing the carrier with the stair climbing aid in different stages of climbing a stair.
Figure 4B:
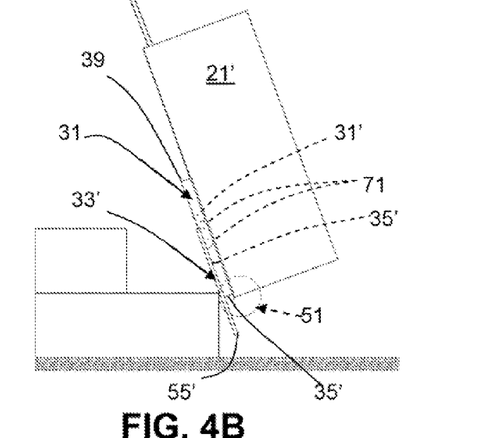
Figure 4C:
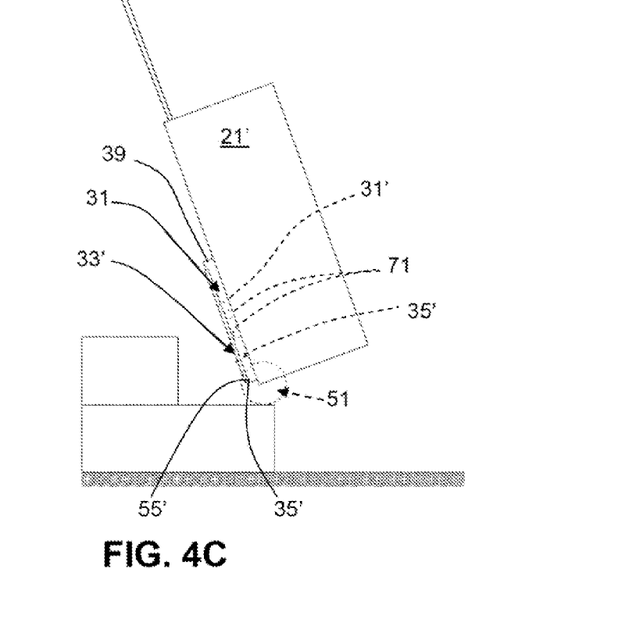

The rearward surface 49 of the flexible elongated member 33 will ordinarily have a high coefficient of friction with a conventional stair tread material, while the front surface 65 of the elongated member will, if it slides against the guide bar 31, have a substantially lower coefficient of friction with the surface of the guide bar with which it is in sliding contact. The guide bar 31 may, however, comprise movable structures such as rollers so that the elongated member 33 is easily moved relative to the guide bar while remaining in contact with the guide bar at a specific portion of the elongated member as the carrier 21 is raised relative to a stair 45 with the portion of the elongated member in contact with the nosing of the stair As seen in FIGS. 4A-4C, the elongated member 33' can be a rigid elongated member that is slidably attached to the guide bar 31. The word "rigid" is intended to describe structures that will support themselves when standing on end such as metal or plastic plates, beams, or structural forms, such as C-shaped, U-shaped, or L-shaped structures. Urging means (not shown in FIGS. 4A-4C) such as springs, elastic cords, electric or other drives, and the like as are used with a flexible elongated member can also be used with the rigid elongated member. The urging means may be connected at both ends, one end, or at some intermediate point between the ends of the rigid elongated member. A single elastic urging means such as a spring or elastic cord, or a single drive, can function to aid in both climbing and descending stairs.

When the elongated member 33' is a rigid elongated member, it is ordinarily shorter than the guide bar 31 (measured from the first end 35 to the second end 39 of the guide bar) and is slidable between a bottom position (FIG. 48) in which the first end of the guide bar is disposed above a bottom end 55' of the elongated member and a top position (FIGS. 4A and 4C) in which the first end of the guide bar is at its lowest position relative to the top end of the elongated member. As seen in phantom in FIGS. 4A-4C, the elongated member 33' may be as long as or longer than the guide bar 31'. When the elongated member 33' is as long as or longer than the guide bar 31', the first end 35' of the guide bar ma be disposed proximate the corner 37 of between the bottom surface 25 and the rear surface 29 only in the sense that it is closer to the corner than the second end 39' of the guide bar. The first end 35' of the guide bar 31 may be disposed at a distance from the corner 37, as long as the guide bar is able to provide support to the rigid elongated member 33' when it is in contact with a nosing 47 of a stair 45 as the cart 21' is raised relative to the stair.

Figure 5A:
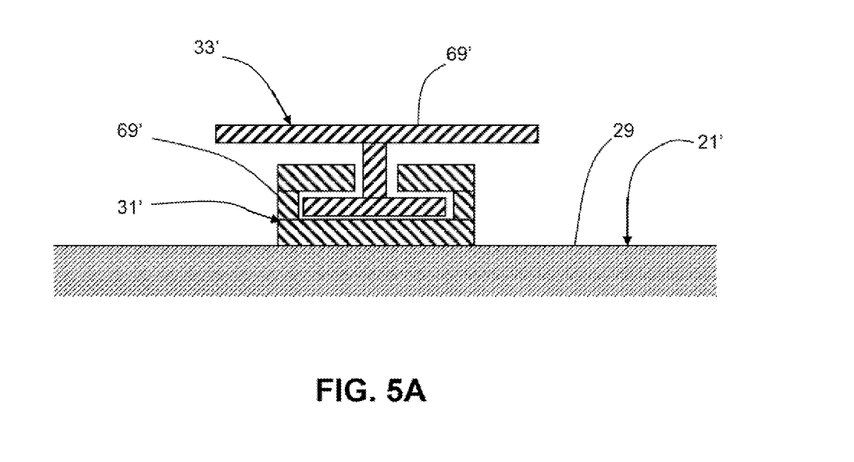
FIG. 5A is a cross-sectional view of a portion of a guide bar and elongated member of a carrier with a stair climbing aid according to an aspect of the present invention, with the guide bar in the form of a track and the elongated member in the form of a rail.

As seen in FIG. 5A, the elongated member 33' may be attached to the guide bar 31' by any suitable means and may be in sliding contact, such as by being in the form of a rail 67' that is slidable in or on a track 69' forming the guide bar as seen in FIG. 5A and/or may roll over one or more rollers 71 (shown in phantom in FIGS. 4A-4C) or bearing arrangements that form part or all of the guide bar.

Figure 5B:
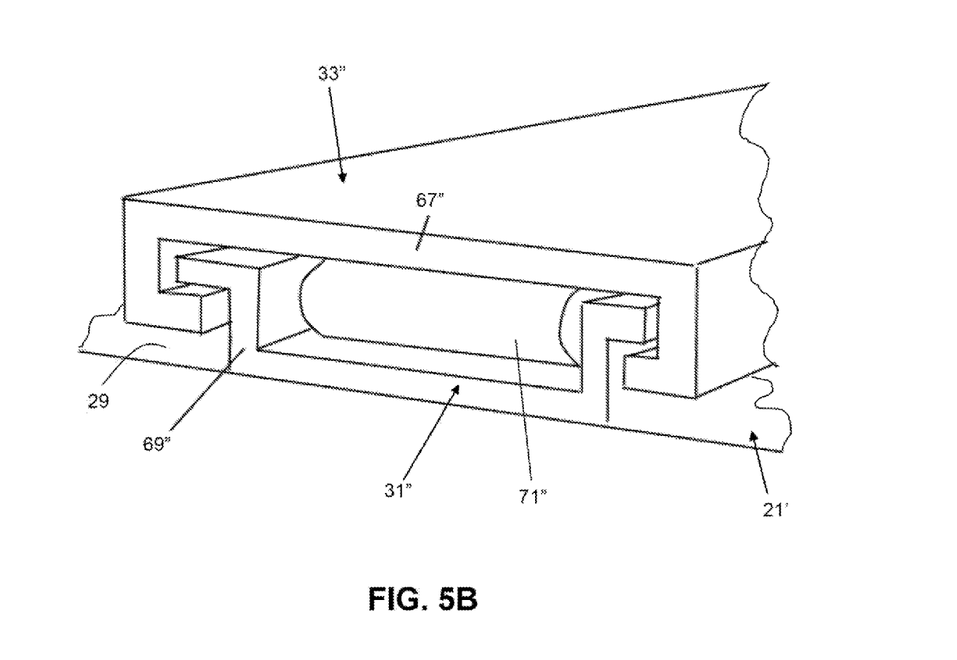
FIG. 5B is a perspective view of a portion of a guide bar and elongated member of a carrier with a stair climbing aid according to another aspect of the present invention, with the guide bar in the form of a track and the elongated member in the form of a rail.

As seen in FIG. 5B, the elongated member 33" may be attached to the guide bar 31" by any suitable means and may be in sliding contact, such as by being in the form of a rail 67'' that is slidable in or on a track 69'' forming the guide bar as seen in FIG. 5B and/or may roll over one or more rollers 71'' (also shown in phantom in FIGS. 4A-4C) or bearing arrangements that form part or all of the guide bar.

FIGS. 6A-6D show details of another embodiment of a rigid elongated member 33''' wherein the elongated member is attached to the guide bar 31''' by side railings 67''' of the elongated member and tracks 69''' of the guide bar that each have elongated slots 167''' and 169''', respectively, therein for receiving axles 171''' of rollers 71'''. The side railings 67''' of the elongated member 33''' are connected to each other by a plate 133''' and the side railings 69''' of the guide bar 31''' are connected to each other by a plate 131'''.

Figures 6A, 6B:
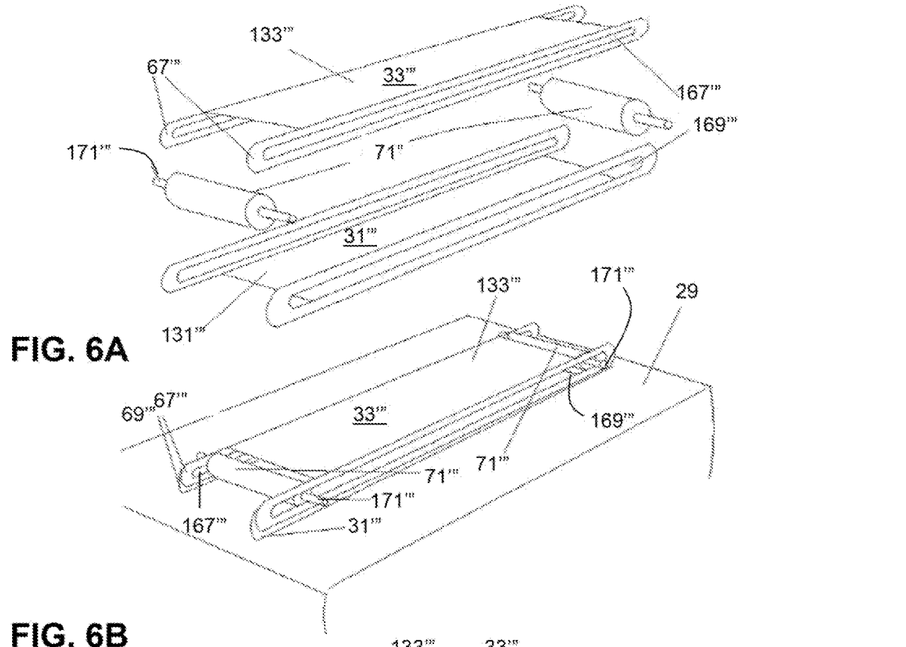
FIG. 6A is an exploded perspective view of a guide bar and elongated member of a carrier with a stair climbing aid according to another aspect of the present invention.
FIG. 6B is a perspective view of the guide bar and elongated member of FIG. 6A.
Figure 6C:
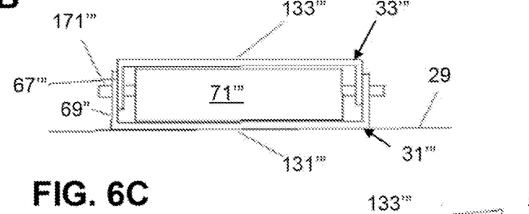
FIG. 6C is an end view of the guide bar and elongated member of FIG. 6B.
Figure 6D:
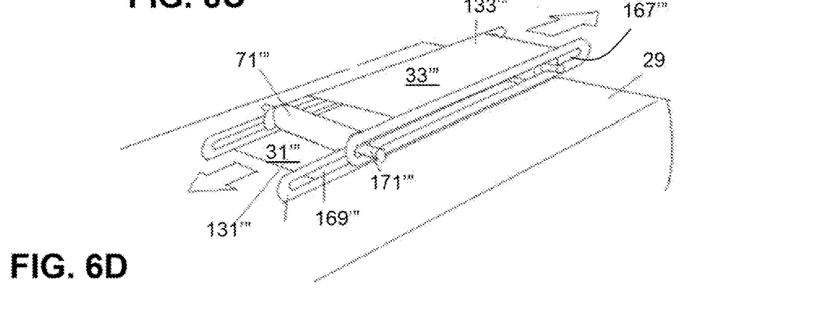
FIG. 6D is a perspective view of the guide bar and elongated member of FIG. 6A with the elongated member displaced from the position shown in FIG. 6B.

The side railing 67''' and rollers 71''' are movable along at least part of the length of the tracks 69'''. Urging means (not shown) are provided to urge one of the rollers 71''' toward one end of the tracks 69''' of the guide bar 31''' and another one of the rollers 71''' toward an opposite end of the tracks of the guide bar. The side railings 67''' of the elongated member 33''' can extend past opposite ends of the plate 133''' and the side railings 69''' of the guide bar 31''' can extend past opposite ends of the plate 131'''. In this way, when, as seen in FIG. 6D, the elongated member 33''' is moved relative to the guide bar 31''' (as will occur when going up or down stairs) the roller 71''' at the end of the slots 167''' in the side railings 67''' of the elongated member 33''' opposite to the direction of movement of the elongated member will not be in contact with the plate 133''' so that there is less friction opposing movement of the elongated member. When the plate 133''' of the elongated member 33''' moves out of contact with a surface such as the nosing of a stair, the urging means urges that roller back toward the end of the side railings 69''' of the guide bar 31'''. The roller 71''' nearer the end of the side railings 67''' of the elongated member 33''' in the direction of movement of the elongated member will be prevented from moving further along the length of the side railings 69''' of the guide bar 31''' because the axles 171''' will be held at the end of the slots 169''' of the side railings of the guide bar.

Ordinarily, the carrier 21 will include two or more guide bars 31 and an equal number of elongated members 33, however, it is possible to provide a single guide bar to which a plurality of connected elongated members are attached, or a single elongated member that extends over a plurality of guide bars.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A carrier with a stair climbing aid, comprising:
   the carrier comprising a top surface, a bottom surface, and a front surface and a rear surface between the top surface and the bottom surface;
   at least one guide bar attached to the rear surface, the guide bar having a first end disposed proximate a corner between the bottom surface and the rear surface and a second end at least as high as stair risers of stairs expected to be climbed;
   at least one elongated member movably attached to the guide bar, a substantial portion of the elongated member being flexible and configured for contacting a nosing of the stair during operation; and
   means for urging a top end of the elongated member toward the second end of the guide bar.

2. The carrier as set forth in claim 1, comprising at least one wheel at the corner between the bottom surface and the rear surface, the first end of the guide bar being disposed even with or below an uppermost point on the at least one wheel that is even with the rear surface.

3. The carrier as set forth in claim 2, wherein at least a portion of the at least one wheel is disposed rearwardly of the rear surface of the carrier, and wherein a rearward surface of the elongated member is disposed rearwardly of the rear surface of the carrier.

4. The carrier as set forth in claim 3, wherein the rearward surface of the elongated member is disposed between a rearwardmost point of the at least one wheel and the rear surface of the carrier.

5. The carrier as set forth in claim 3, wherein the rearward surface of the elongated member is disposed even with a rearward most point of the at least one wheel.

6. The carrier as set forth in claim 3, wherein the rearward surface of the elongated member is disposed rearwardly of a rearwardmost point of the at least one wheel.

7. The carrier as set forth in claim 1, wherein the urging means comprises a spring.

8. The carrier as set forth in claim 1, wherein the urging means comprises an elastic cord.

9. The carrier as set forth in claim 1, wherein the urging means comprises a drive.

10. The carrier as set forth in claim 1, wherein the elongated member is attached to and slidable relative to the first end of the guide bar at a bottom end of the elongated member.

11. The carrier as set forth in claim 10, wherein the elongated member is attached to but slidable relative to the guide bar at the top end of the elongated member.

12. The carrier as set forth in claim 11, wherein the urging means connects the top end of the elongated member to the guide bar.

13. The carrier as set forth in claim 1, wherein the at least one elongated member comprises a plurality of elongated members.

14. The carrier as set forth in claim 13, wherein the at least one guide bar comprises a plurality of guide bars.

15. The carrier as set forth in claim 1, wherein the urging means is adapted to urge a bottom end of the elongated member toward the first end of the guide bar.

16. A carrier with a stair climbing aid, comprising:
   the carrier comprising a top surface, a bottom surface, and a from surface and a rear surface between the top surface and the bottom surface;
   at least one oxide bar attached to the rear surface, the guide bar having a first end disposed proximate a corner between the bottom surface and the rear surface and a second end at least as high as stair risers of stairs expected to be climbed;
   at least one elongated member movably attached to the guide bar, a substantial portion of the elongated member being flexible and configured for contacting a nosing of the stair during operation; and means for urging a bottom end of the elongated member toward the first end of the guide bar.

17. A stair climbing aid for a carrier, the carrier comprising a top surface, a bottom surface, and a front surface and a rear surface between the top surface and the bottom surface, the stair climbing aid comprising:
- at least one guide bar attachable to the rear surface, the guide bar having a first end adapted to be disposed proximate a corner of the carrier between the bottom surface and the rear surface and a second end adapted to be disposed at least as high as stair risers of stairs expected to be climbed;
- at least one elongated member movably attached to the guide bar, a substantial portion of the elongated member being flexible and configured for contacting a nosing of the stair during operation; and
- means for urging at least one of a top end of the elongated member toward the second end of the guide bar and a bottom end of the elongated member toward the first end of the guide bar.

\* \* \* \* \*